Patented June 7, 1932

1,862,061

UNITED STATES PATENT OFFICE

EDWIN B. NEWTON, OF AKRON, OHIO, ASSIGNOR TO AMERICAN ANODE, INC., OF NEW YORK, N. Y., A CORPORATION OF DELAWARE

METHOD OF PURIFYING AQUEOUS DISPERSIONS

No Drawing. Application filed September 22, 1928. Serial No. 307,789.

This invention relates to the art of purifying latex or similar aqueous dispersions and has as its object the removal of dissolved volatile gases or substances which decompose readily with the formation of gaseous products.

Natural rubber latex is quite unstable, usually coagulating spontaneously within 24 or 48 hours, but if a sufficient quantity (1 or 2%) of an alkaline preservative such as ammonia is added, the latex may be stored for months or years without coagulation. It is therefore this ammonia-preserved latex which is available for the production of rubber articles by electrodeposition or electrophoresis. However, the greater part of the ammonia must be removed in order that the alkalinity of the latex have the proper value (pH about 8 to 10) for successful electrodeposition. This is most readily and economically accomplished by simple aeration, allowing the ammonia to evaporate. But since the latex is always somewhat alkaline, it readily absorbs carbon dioxide from the air, during the aeration or even during storage or shipment. During the electrodeposition of the rubber of the latex upon the anode of an electrophoretic cell, the carbon dioxide is liberated simultaneously therewith, accompanied by other gases due to electrolytic decomposition, with the result that the rubber deposit is pitted or even spongy. This undesirable effect is especially noticeable in the production of heavy deposits, when the resistance of the formed deposit to the passage of the depositing electric current causes a considerable rise in temperature.

The present invention in brief consists in the removal of the greater part of the dissolved gases or volatile substances from latex or other dispersions by blowing a neutral gas through the heated dispersion. The purpose of the heating is to decompose substances which give rise to objectionable gaseous products during electrophoresis or other subsequent employment of the dispersion and to facilitate removal of such gases or gas-forming principles from the latex. The process in general is carried out by heating the dispersion to a temperature approaching the boiling point, and then blowing a rapid current of a neutral or inert gas through the liquid in order to carry away the volatile substances dissolved therein. The heating may be accomplished by any convenient means, such as steam coils, or a steam jacket around the container, or even by means of a direct flame, although this latter is more likely to coagulate and scorch such a sensitive dispersion as latex. In many cases in which the attendant dilution is not objectionable the most convenient means of heating will be found to be the direct condensation of steam in the liquid, in which case the current of steam serves both to heat the liquid and to remove the volatile substances. However, even when one medium, such as steam, is employed both for the heating and blowing, the process takes place in two more or less distinct steps, the steam being practically all condensed and serving only to heat the liquid during the first step, and during the second step, after the liquid is heated, bubbling through and escaping from the liquid.

The neutral gas which is blown through the liquid may be any gas which has little or no effect on the stability of the latex or other dispersion being treated, and which is not appreciably soluble in hot water. The term "neutral gas" will hereinafter be employed to include all such gases. Air, especially if washed, is quite satisfactory, but steam appears to give the best results. The length of time that the treatment must be continued can be determined only by experiment and observation to find whether the removal of the volatile substances is sufficiently complete for the purpose for which the dispersion is intended. Ordinarily the passage of a current of gas which will agitate the liquid vigorously for a period of from 30 minutes to 5 hours is sufficient.

Certain precautions must be observed to prevent premature coagulation of the dispersions. Latex and similar dispersions are often stabilized with ammonia or other volatile base, which is almost completely removed during the treatment outlined above. In order to prevent coagulation of dispersions not containing sufficient non-volatile base, the ammonia must be replaced by such a nonvolatile base, for example sodium or potassium hydroxide, trisodium phosphate, sodium borate, etc. If desired, a preservative may be added to the dispersion, either before, during, or after the heating or blowing operation. The salts of the alkali metals with the phenols have proven particularly useful, since they serve the double function of maintaining the alkalinity and preserving the liquid from putrefaction. It has also been found that heated latex tends to coagulate when brought into contact with iron or other metals. Therefore the heating is preferably carried out in a glass or rubber lined vessel, and the gas admitted through a rubber hose.

As a specific example of one embodiment of the method of this invention, 50 gallons of commercial ammonia-preserved latex (0.7% ammonia, 35% rubber) are placed in a steam-jacketed glass-lined kettle, and 1.25 lbs. of phenol (0.3% based on the total weight of the latex) in the form of potassium phenolate solution are added as a preservative, and to maintain the alkalinity at the desired value after the removal of the ammonia. The latex is then heated by admitting steam to the jacket of the kettle, the contents being stirred to prevent the formation of a skin of rubber on the surface. When the temperature has risen to about 80° C. a rapid current of steam is admitted near the bottom of the kettle, preferably through a rubber hose, the volume of steam being so regulated as to prevent excessive foaming. After 3 or 4 hours the gas-forming substances are substantially decomposed and the gases and other dissolved volatile substances largely removed. The steam is then turned off and the latex is preferably allowed to cool to a temperature of 50° C. or lower before being transferred to a metal container. When such treated latex is subjected to electrophoresis, a smooth, compact deposit is obtained.

Although the process of this invention is particularly useful in preparing aqueous dispersions for electrophoresis, such subsequent use of the dispersions forms no part of this invention, and the purification of latex or other dispersions by the said process is within the spirit and scope of this invention regardless of subsequent employment. Neither is the invention limited to latex or rubber dispersions. Emulsions of fatty or mineral oils, waxes, asphalt, etc., or suspensions of solids such as zinc oxide, silica, carbon black, sulphur, etc., may also profitably be treated by the process of this invention.

It is to be understood that the term "dispersion" is employed in the appended claims in a generic sense to include aqueous emulsions or suspensions of any material substantially insoluble in water, the particles of the emulsion or suspension being of such fineness that they settle (or rise to the surface) only very slowly. The term "latex" is likewise employed in the claims in a generic sense to include natural rubber latex, balata, gutta percha, and other similar latices, and artificial latices produced by the dispersion in water of crude, vulcanized, reclaimed, or synthetic rubber, or balata, gutta percha, rubber isomers, or rubber derivatives, whether or not admixed with fillers, pigments, vulcanizing agents, etc.

I claim:

1. The method of purifying an aqueous dispersion which comprises heating the dispersion and blowing steam therethrough.

2. The method of purifying natural rubber latex which comprises heating the latex and blowing steam therethrough.

3. The method of purifying ammonia-preserved natural rubber latex which comprises heating the latex in the presence of a non-volatile base and blowing steam therethrough.

4. The method of purifying ammonia-preserved natural rubber latex which comprises heating the latex in the presence of a non-volatile base and a preservative and blowing steam therethrough.

5. The method of purifying ammonia-preserved natural rubber latex which comprises heating the latex in the presence of a non-volatile alkaline preservative and blowing steam therethrough.

6. The method of purifying an aqueous dispersion which comprises heating the dispersion, and blowing a neutral gas therethrough in the presence of a non-volatile base.

7. The method of purifying an aqueous dispersion which comprises heating the dispersion, adding a non-volatile base, and blowing a neutral gas therethrough.

8. The method of purifying latex which comprises heating the latex, adding a non-volatile base, and blowing a neutral gas therethrough.

In witness whereof I have hereunto set my hand this 19th day of September, 1928.

EDWIN B. NEWTON.